N. ADAMS.
Hand-Trucks.

No. 145,268. Patented Dec. 9, 1873.

Witnesses
Thomas J. Bewley.
William P. Wright.

Inventor
Nathan Adams
By His Attorney
Stephen Ustick

UNITED STATES PATENT OFFICE.

NATHAN ADAMS, OF ALTOONA, PENNSYLVANIA.

IMPROVEMENT IN HAND-TRUCKS.

Specification forming part of Letters Patent No. 145,268, dated December 9, 1873; application filed March 25, 1873.

*To all whom it may concern:*

Be it known that I, NATHAN ADAMS, of Altoona, in the county of Blair and State of Pennsylvania, have invented certain Improvements in Hand-Trucks, of which the following is a specification:

The first part of my invention relates to the combination of a hooked lever with a slotted tongue of a truck for holding the load securely, the lever being adjustable by means of hooks in its under edge, either of which is engaged at pleasure with one of a series of pins which extend through the slot of the lever. The second part of the invention relates to shoulders at the forward end of the truck-frame to prevent the load slipping onto the wheels.

Figure 3:
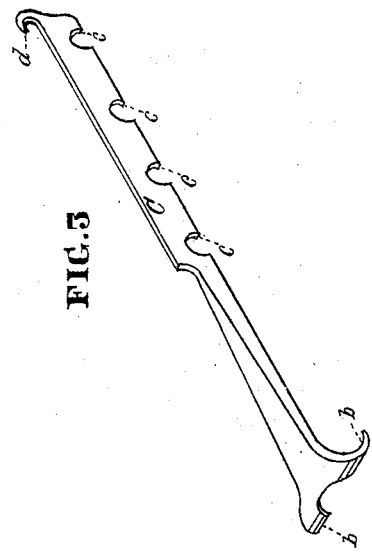
Figure 1:
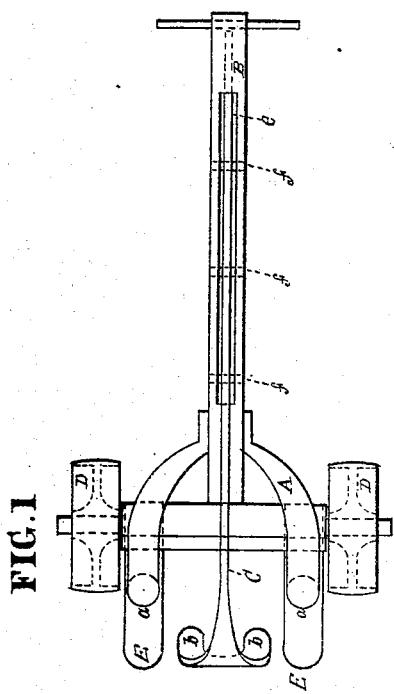
Figure 2:
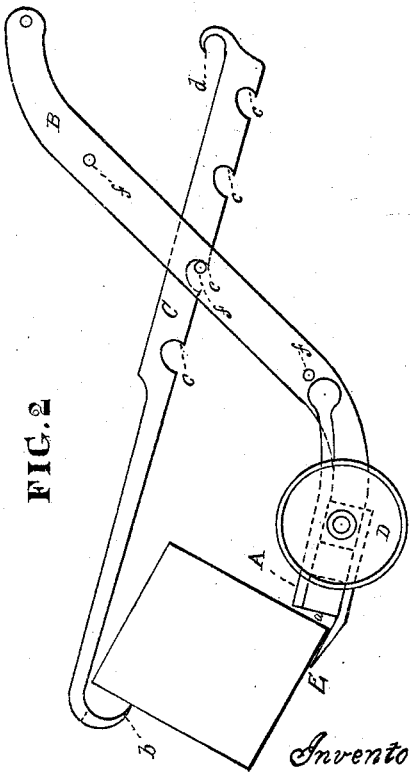

Figure 1 is a plan view of the improved truck. Fig. 2 is a side view with a load held on the truck. Fig. 3 is an isometrical view of the hooked lever C in a reverse position.

Like letters in all the figures indicate the same parts.

A is the truck-frame, having a slotted tongue, B, for the connection of the lever C, for holding the load on the truck. The truck-frame has at its forward end shoulders $a\ a$, which prevent the load slipping against the wheels D D. The lever has hooks $b\ b$, which engage with the load, and a series of hooks, $c$, formed in its under edge, and also a hook, $d$, at its free end. The tongue has a vertical longitudinal slot, $e$, through which a series of pins, $f$, extend for the connection of the hooks of the lever.

The operation is as follows: The pointed prongs E E of the truck-frame A are pushed under the load, so as to bring the shoulders $a\ a$ against it to prevent it slipping onto the wheels D D, and the grappling-hooks $b\ b$ being connected with the top of the load, one of the hooks of the lever is connected with a pin, $f$, of the tongue B, whereby the load is held securely on the truck, as seen in Fig. 2.

There being a series of hooks and pins, as described, for connecting the lever with the tongue, longitudinal adjustments of the former are readily made in adaptation to loads of various sizes.

I claim as my invention—

1. The lever C, having grappling-hooks $b\ b$ at its forward end, and a series of hooks, $c$, in its lower edge, in combination with the pins $e$ of the slotted tongue B, substantially in the manner and for the purpose above set forth.

2. The truck-frame A, having the shoulders $a\ a$ at the forward end for preventing the burden from coming against the wheels D D, substantially as described.

NATHAN ADAMS.

Witnesses:
 THOMAS J. BEWLEY,
 STEPHEN USTICK.